US006382605B1

(12) United States Patent
Kato

(10) Patent No.: US 6,382,605 B1
(45) Date of Patent: May 7, 2002

(54) VIBRATION PREVENTING APPARATUS

(75) Inventor: Kazuhiko Kato, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/563,496

(22) Filed: May 3, 2000

(30) Foreign Application Priority Data

May 18, 1999 (JP) ............................................ 11-137448

(51) Int. Cl.[7] .................................................. F16F 7/00
(52) U.S. Cl. ............................ 267/141.2; 267/140.12; 267/293
(58) Field of Search ........................ 267/140.11, 140.4, 267/136, 141.2, 140.13, 292, 293, 153, 140.12, 141; 248/560, 638

(56) References Cited

U.S. PATENT DOCUMENTS

| 5,076,725 A | * | 12/1991 | Nakaura | 267/141.2 |
| 5,139,244 A | * | 8/1992 | Chakko | 267/293 |
| 5,551,661 A | * | 9/1996 | Bunker | 267/141 |
| 5,671,908 A | * | 9/1997 | Kato | 267/140.12 |
| 5,890,704 A | * | 4/1999 | Tsutsumida | 267/140.12 |
| 5,906,360 A | * | 5/1999 | Kanda | 267/140.12 |
| 6,068,247 A | * | 5/2000 | Rudolph | 267/140.12 |

FOREIGN PATENT DOCUMENTS

| JP | 05141462 | * | 6/1993 | .............. 267/141.2 |
| JP | 07004459 | * | 1/1995 | |

* cited by examiner

Primary Examiner—Christopher P. Schwartz
Assistant Examiner—Mariano Sy
(74) Attorney, Agent, or Firm—Oblon, Spivak, McClelland, Maier & Neustadt, P.C.

(57) ABSTRACT

A vibration preventing apparatus has a structure in which influences stopping the functioning of the stopper portion and strengthening the tubular portion are small. The structure is convenient to secure the stability of the stopper portion in forming the mounting member by inject-molding in an allowable mounting space. The vibration preventing apparatus has an inner member, a rubber elastic body including a tubular body portion fixed integrally to an outer peripheral surface of the inner member, a stopper portion provided at one end of the body portion to protrude radially outwardly and to extend circumferentially, and a resin mounting member including a tubular portion formed by an inject-molding step on an outer peripheral surface of the body portion of the rubber elastic body. The stopper portion has an inside portion protruded from the end surface of the tubular portion axially inwardly, and the tubular portion has, at an inner peripheral side of the end surface, a step-like concave portion concaved radially inwardly to receive the stopper portion.

7 Claims, 3 Drawing Sheets

VIBRATION PREVENTING APPARATUS

BACKGROUND OF THE INVENTION

1. Field of the Invention

This invention relates to a vibration preventing apparatus suitably used as an engine mount or a bushing in a vehicle etc., for example.

2. Discussion of the Related Art

Conventionally, when an engine unit to be installed to a vehicle is mounted onto a vehicle body, it is supported in a vibration prevented state via a vibration preventing apparatus such as an engine mount etc. Thus, the vibration preventing apparatus reduces or damps transmission of the vibration generated by the engine unit to the vehicle body. One example of the engine mount is shown in FIGS. 4 and 5.

This engine mount is comprised of an inner member 5 formed into a pipe shape, a rubber elastic body 6 including a body portion 61 and a pair of stopper portions 62, 62, an mounting member 7 including a tubular portion 71, and an elastic stopper 8.

In detail, the tubular body portion 61 of the rubber elastic body 6 is fixed to an outer peripheral surface of the inner member 5 integral therewith and having two cavities 63, 64 penetrating the body portion 61 axially, and the paired stopper portions 62, 62 are protruded radially outwardly and extended circumferentially from both axial ends of the body portion 61. The tubular portion 71 of the resin mounting member 7 is formed on an outer peripheral surface of the body portion 61 of the rubber elastic body 6 by an inject-forming (molding), and is adhered at each of end surfaces thereof to each of inner end surfaces of the stopper portions 62, 62. The elastic stopper 8 is fixed on an inner peripheral surface of the tubular portion 71 of the mounting member 7 and positioned in a cavity 63 to oppose to the inner member 5.

This engine mount is normally produced as explained below. In the first embodiment, the rubber elastic body 6 and the elastic stopper 8 are vulcanized and formed together with the inner member 5, and an adhering process is performed at a predetermined portion of a vulcanizedly formed body. Then, the vulcanizedly formed body is disposed in a resin forming mold for molding the mounting member 7, and a resin material is inject-molded onto an outer peripheral surface of the body portion 61 of the rubber elastic body 6 to form the mounting member 7. Thus, the mounting member 7 including the tubular body 71 is formed. Here, an inner peripheral surface of the tubular body 71 is adhered to the outer peripheral surfaces of the body portion 61 of the rubber elastic body 6 and the elastic stopper 8, and both end surfaces of the tubular portion 71 are adhered to inner side surfaces of the stopper portions 62, 62. In this way, the engine mount shown in FIGS. 4 and 5 is produced.

The engine mount thus produced is fixed at one of the inner member 5 and the mounting member 7 to the engine unit and is fixed at the other of them to the vehicle body for use so that the elastic stopper 8 positions in a main vibration inputting direction directed in the radial direction.

When the vibration is inputted from the engine unit to the engine mount, the body portion 61 of the rubber elastic body 6 disposed between the inner member 5 and the tubular portion 71 of the mounting member 7 elastically deforms to damp the vibration effectively. Here, in the case where the large vibration is inputted to the engine mount in the radial direction, the elastic stopper 8 regulates an excessive relative radial shift between the inner member 5 and the mounting member 7. On the other hand, in the case where the large vibration is inputted to the engine mount in the axial direction, the stopper portions 62, 62 disposed between end surfaces of the tubular portion 71 and a mating members (not shown) elastically attenuates a collision therebetween, so that excessive relative axial shift between the inner member 5 and the mounting member 7 is regulated. In this way, the satisfactory durability of the rubber elastic body 6 is secured by the excessive deformation prevention of the body portion 61.

By the way, in the conventional engine mount, each of the paired stopper portions 62, 62 provided at both axial ends of the rubber elastic body 6 has a small thickness in the axial direction, and therefore is unstable so as to easily fall down in the axial direction in the stage where the rubber elastic body 6 and the elastic stopper 8 are vulcanizedly formed together with the inner member 5. Accordingly, when the rubber elastic body 6 and the elastic stopper 8 are set in the resin forming mold and form the mounting member 7 by inject-molding, the stopper portions 62, 62 set in the resin forming mold may fall down. If such fall-down of the stopper portions 62, 62 occurs, a problem may be caused, i.e. the end surfaces of the forming tubular portion 71 and the stopper portions 62, 62 will not be adhered together in the desired condition. Especially, when a pour-in pressure of the resin forming material in the inject-molding step is insufficient, a bad adhesion between the end surfaces of the tubular portion 71 and the stopper portions 62, 62 becomes remarkable.

In view of the above, as one means for preventing the bad adhesion, a resin pour-in port of the resin forming mold for performing the inject-molding of the mounting member 7 is disposed between the both stopper portions 62,62 to generate an outward resin flow. Such resin flows may press the stopper portions 62, 62 onto an inner surface of the resin forming mold. However, by taking strength of the forming mounting member 7 into consideration, the resin pour-in port is selected at the position so that a weld portion of the mounting member 7 having the weakest strength (position where the poured in and flowing resin circumferentially joins) corresponds to the part of the engine mount to which the smallest vibration is inputted. That is, the resin pour-in port is selected so that the weld portion is shifted from the main vibration inputting direction in the circumferential direction. For this reason, if the resin pour-in port is disposed between the both stopper portions 62, 62, there may arise problems that position of the stopper portions 62, 62 is restricted, or circumferential length of the stopper portions 62, 62 is unnecessarily elongated.

On the other hand, the axial dimension (thickness) of each of the stopper portions 62, 62 can be increased to secure stability of the stopper portions 62, 62. However, when thickness of each of the stopper portions 62, 62 is increased outwardly, axial distance between the outer side surface of the stopper portion 62 and the mating member is decreased by a part or mount corresponding the increased part or mount of the stopper portion 62. As s result, abutment between each of the stopper portions 62,62 and the mating member occurs earlier when the large axial vibration is inputted into the engine amount, which deteriorates the riding feeling of the passenger.

Also, when thickness of each of the stopper portions 62, 62 is increased inwardly, an axial length of the tubular portion 71 is decreased corresponding to the thickness increase of the stopper portions 62. As a result, not only the strength decrease of the tubular portion 71 is introduced but the durability deterioration of the rubber elastic body 6 due to increase of the relative radial shifted amount between the inner member 5 and the mounting member 7 is caused.

SUMMARY OF THE INVENTION

The present invention is made in view of the above circumstances, and has the subject matter to provide a vibration preventing apparatus having a structure in which influences to stopping function of the stopper portion and to strength of the tubular portion etc. are small, and which is convenient to secure stability of the stopper portion in forming the mounting member by the inject-forming, in an allowable mounting space.

In order to overcome subject matter, the vibration preventing apparatus of the present invention is comprised of an inner member, a rubber elastic body including a tubular body portion fixed to an outer peripheral surface of said inner member integrally and a stopper portion provided at least one end of the body portion to protrude radially outwardly and to extend circumferentially, and a mounting member made of a resin and including a tubular portion formed by an inject-molding on an outer peripheral surface of the body portion of said rubber elastic body.

The stopper portion of said rubber elastic body has an inside protruded portion protruded from end surface of the tubular portion of the mounting member axially inwardly, and the tubular portion of the mounting member has at an inner peripheral of the end surface a step-like concave portion concaved radially inwardly to receive the stopper portion of said rubber elastic body.

According to the present invention, the stopper portion of the rubber elastic body has the inside protruded portion protruding inwardly over an end surface of the tubular portion of the mounting member and being contained in a step-like concave portion formed at the end surface of the tubular portion. This inside protruded portion increases the axial dimension (thickness) of the stopper portion and makes the stopper portion stable. In this way, when the rubber elastic body etc. are disposed in the resin forming mold and the mounting member is formed by the inject-molding, the stopper portion can be set at the predetermined position of the resin forming mold in the stabilized condition.

As a result, the tubular portion (step-like concave portion) of the mounting member formed by the inject-molding and the stopper portion (inside protruded portion) can be adhered satisfactorily. Also, on account of stabilization of the stopper portion when the rubber elastic body etc. are set in the resin forming mold, the disposing position of the resin pour-in port needs not be coincided with position of the stopper portion, whereby the stopper portion can be disposed at the suitable position by the suitable size (circumferential length).

In addition, the stopper portion of the rubber elastic body is adhered at the inside protruded portion thereof to a surface of the step-like concave portion of the tubular portion of the mounting member, in other words, an mount end portion of the stopper portion (the position where the outer peripheral surface of the stopper portion crosses with the end surface of the body portion of the mounting member) which is the easiest to be peeled off from the tubular portion in the adhesion of the stopper portion to the tubular portion is located at position spaced from the inside surface of the stopper portion (inside surface of the inside protruded portion) outwardly. Consequently, the adhering responsibility between the stopper portion and the tubular portion increases. Thus, the stopper portion can exercise the stopper function stably.

Here, thickness of the stopper portion of the rubber elastic body of the present invention does not increase outwardly, so distance between an outside surface of the stopper portion and the opposed mating member is not shortened, and therefore the stopper function of the stopper portion is not influenced or deteriorated. Also, the axial length of the tubular portion (length between the both end surfaces of the tubular portion) of the mounting member is not changed, large strength decrease of the tubular portion is not caused, or durability deterioration of the rubber elastic body due to the change of relative axial shifted amount between the inner member and the mounting member is not caused.

According to the vibration preventing apparatus of the present invention, the influences to stop the function of the stopper portion of the rubber elastic member and to strengthen the tubular portion of the mounting member can be made small, and stability of the stopper portion in forming the mounting member by the inject-molding step can be secured, in an allowable mounting space.

The present invention can have the following embodiments or formations.

The inner member is positioned at a central portion of the vibration preventing apparatus of the present invention, and is mounted to one of two members. Here, when the vibration preventing apparatus is the engine mount, the inner member is mounted on an engine unit or a vehicle body for use. The inner member can have a pipe shape and can be formed by a metal.

The body portion of the rubber elastic body can have one or more cavities penetrating the body portion axially. In providing two cavities, they can be disposed at opposite sides of the inner member in the radial direction. The stopper portion(s) can be provided at one end or both ends of the body portion, and can be disposed in an arch shape on a part of both end portions of the body portion. The inside portion of the stopper portion can protrude from an inside surface of the stopper portion axially inwardly by an outer diameter either the same as or different from an outer diameter of the stopper portion.

The mounting member is mounted onto the other of the above two members, and mounted on the vehicle body or the engine unit for use when the vibration preventing apparatus is the engine mount. The mounting member can be joined to the inner member in the inject-molding and the rubber elastic body formed integrally. The step-like concave portion (s) of the tubular portion desirably has a complementary shape with shape of the inside protruded portion of the stopper portion, and can be formed by removing an circumferential periphery of the inner portion at one end or both ends of the tubular portion by a predetermined length in the radial and axial directions.

Also, an elastic stopper can be disposed between inner member and the mounting member to prevent excessive deformation of one or both of them in the radial direction. Here, the elastic stopper can be disposed in the cavity formed in the rubber elastic body.

PREFERRED EMBODIMENT OF THE INVENTION

Figure 1:
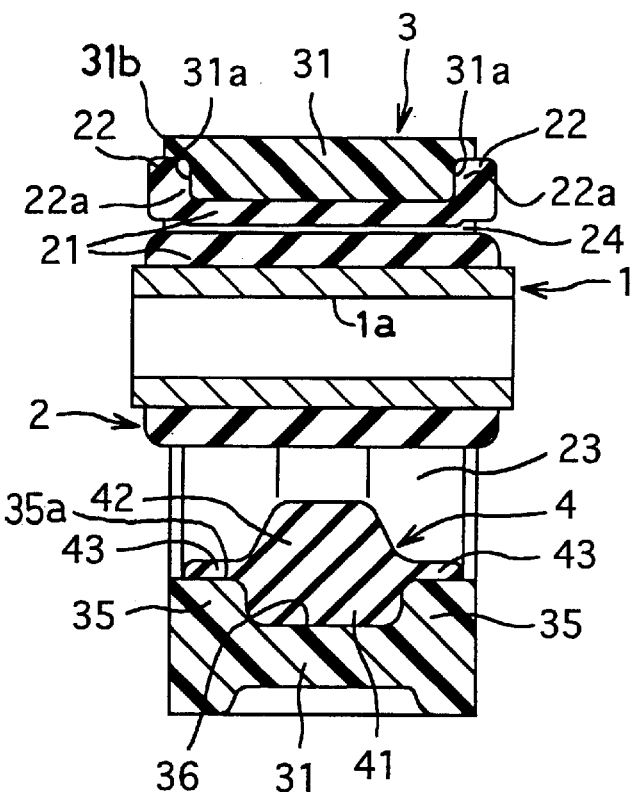
FIG. 1 is a cross-sectional view showing one embodiment of the vibration preventing apparatus according to the present invention along a shaft thereof, and corresponding to a cross-sectional view taken along I—I in FIG. 2.
Figure 2:
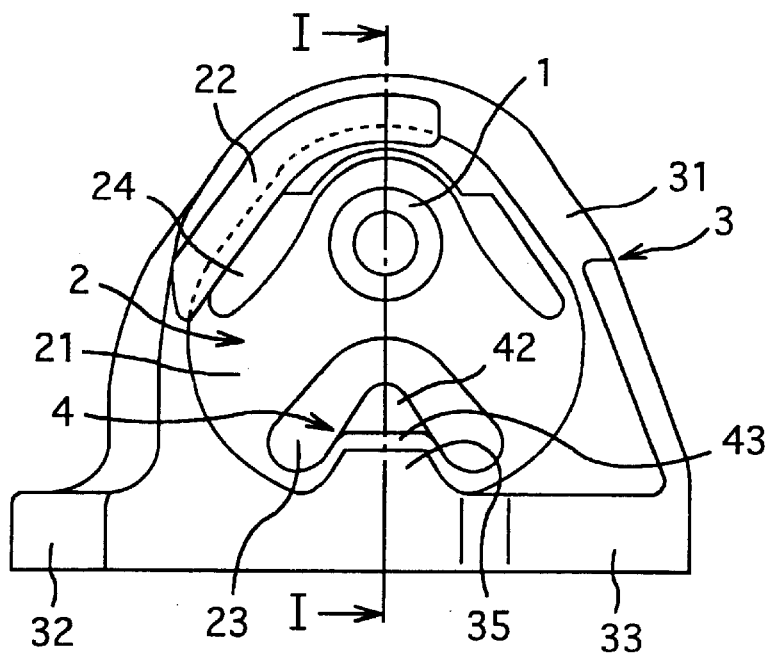
FIG. 2 is a front view of the vibration preventing apparatus according to the present invention.

Hereinafter, an embodiment of the present invention will be explained with reference to mounted FIGS. 1 to 3. Here, FIG. 1 is a cross-sectional view showing one embodiment of the vibration preventing apparatus according to the present invention along a shaft thereof and corresponding to a cross-sectional view taken along I—I in FIG. 2; FIG. 2 is a front view of the vibration preventing apparatus according to the present invention; and FIG. 3 is a plan view of the vibration preventing apparatus according to the present invention.

Figure 3:
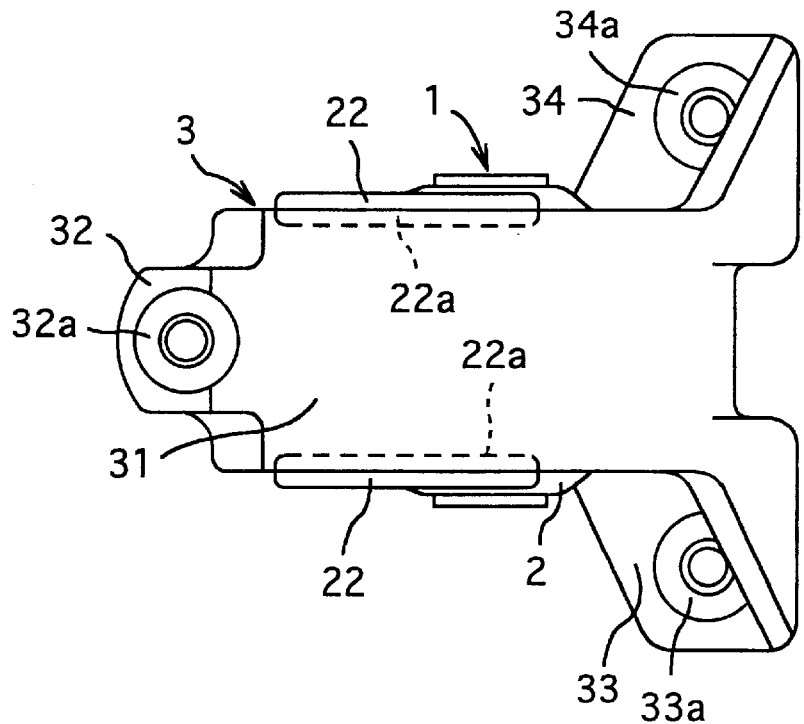
FIG. 3 is a plan view of the vibration preventing apparatus according to the present invention.
Figure 4:
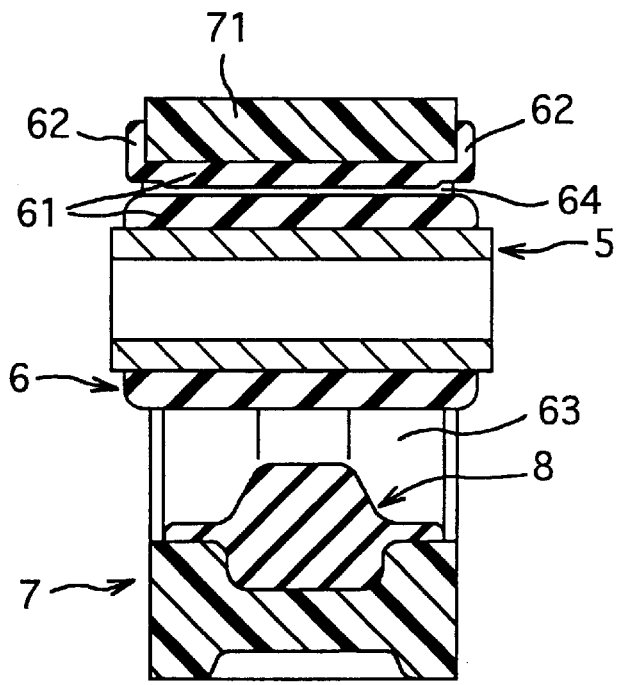
FIG. 4 is a cross-sectional view showing one example of the conventional vibration preventing apparatus along a shaft thereof, and corresponding to a cross-sectional view taken along IV—IV in FIG. 5.
Figure 5:
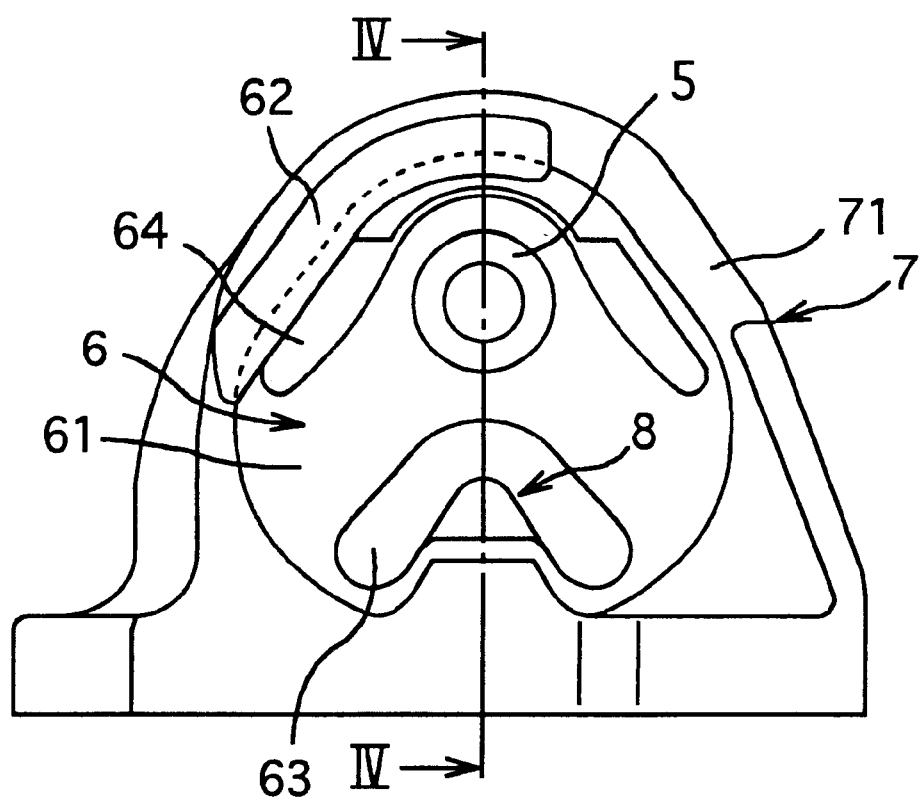
FIG. 5 is a front view of the conventional vibration preventing apparatus.

The vibration preventing apparatus of this embodiment is, as shown in FIGS. 1 to 3, comprised of an inner member 1; a rubber elastic body 2 including a body portion 21 fixed to the inner member 1 and having cavity 23 penetrating axially, and a pair of stopper portions 22, 22 at both axial ends of the body portion 21 and each having an inside protruded portion 22a; a mounting member 3 made of a resin material and having a tubular portion 31 formed on an outer peripheral surface of the body portion 21 and being provided with at each of both end surfaces thereof a step-like concave portion 31a; an elastic stopper 4 fixed on an inner peripheral surface of the tubular portion 31 to protrude toward the inner member through the cavity 23 of the rubber elastic body 2, as main parts.

In detail, the inner member 1 is formed into a pipe shape by a metal and having an inner hole 1a into which a mounting bolt (not shown) is inserted.

The tubular body portion 21 of the rubber elastic body 2 is integrally fixed to the outer peripheral surface of the inner member 1, and the paired stopper portions 22, 22 are provided at both ends of the body portion 21 to protrude radially outwardly and to extend circumferentially. This rubber elastic body 2 is formed, in the condition where the inner member 1 is set in a vulcanize forming mold, by vulcanizing and forming a rubber material. The inner peripheral surface of the body portion 21 is vulcanizedly fixed to the outer peripheral surface of the inner member 1. The body portion 21 is provided, at both sides of the inner member 1 in a main vibration inputting direction (upper/lower direction in FIG. 2), two cavities 23, 24 penetrating the body portion 21 axially to set the spring constant of the rubber elastic body 2 in the predetermined value.

As shown in FIGS. 1 and 3, one (right in FIG. 1) of the stopper portions 22 has the inside protruded portion 22a protruded axially inwardly from an inside surface thereof over an end surface 31b of the tubular portion 31 of the mounting member 3 to be fully explained next. The inside protruded portions 22a increase thickness of the stopper portions 22 in the axial direction. Other (left) stopper portion 22 has the same construction as the above one stopper portion 22. As shown in FIG. 2, one stopper portion 22 is provided on a part of one end of the body portion 21 in an arch shape extending partially in the circumferential direction. This part of the body portion 21 corresponds to position of a mating member (not shown) facing with the end surface of the tubular portion 31 when the vibration preventing apparatus is mounted for use.

As shown in FIG. 1, the mounting member 3 includes, in addition to the tubular portion 31, three mount seating portion 32 to 34, and a pair of side stoppers 35, 35. The tubular portion 31 has at both axial end surfaces thereof the step-like concave portions 31a, 31a. The three mount seating portions 32, 33 and 34 protrude outwardly from a lower part of the circumferential portion of the tubular portion 31 and having amount seating surfaces located on the same or common surface. The paired side stoppers 35, 35 are disposed at predetermined positions on the inner surfaces of the tubular portion 31 in the circumferential direction (positions corresponding to the main vibration inputting direction), protruding from the both axial ends of the tubular portion 31 toward the inner member 1, and being provided with a concave portion 36 concaved radially outwardly between the both side stoppers 35, 35.

The tubular portion 31 is formed into a substantial tubular shape having an inner diameter larger than an outer diameter of the inner member 1 by a predetermined dimension, and having axial length slightly shorter than that of the inner member 1. At inner peripheries of both end surfaces of the tubular portion 31, in area corresponding to the above inside protruded portions 22a, 22a of the rubber elastic body 2, the step-like concave portions 31a, 31a to contain the inside protruded portions 22a, 22a therein are formed. The inside protruded portion 22a of each stopper portion 22 and each step-like concave portion 31a are adhered to each other at adhering surfaces (the inside surface and the half (axially inside) of the outer periphery surface of the stopper portion 22 and the corresponding surface of the step-like concave portion 31a). As shown in FIG. 3 in each of the mount seating portions 32 to 34, nuts 32a to 34a with which mounting bolts (not shown) are screwed are buried.

The mounting members 3 are inject-molded by a resin (6-6 nylon filled with glass fibers as the reinforcing fibers by 40 to 50 weight %) as a forming material. The inject-molding of the mounting member 3 is carried out in a condition where the inner member 1 and the rubber elastic body 2 joined together and the elastic stopper 4 are set in the resin forming mold. By this inject-molding, the mounting member 3 of which an inner periphery surface is adhered to the outer peripheral surfaces of the rubber elastic body 2 and the elastic stopper 4 is formed.

The elastic stopper 4 is made the rubber material same as that of the rubber elastic body 2, and is partially buried in the concave portion 36 formed between the both side stoppers 35, 35 of the tubular portion 31a in the cavity 23 of the rubber elastic body 2. This elastic stopper 4 is constructed by a protruded base portion 41, a protruded tip end portion 42, and a pair of elastic surface layers 43, 43. The protruded base portion 41 is buried in the concave portion 36 of the tubular portion 31 of the rubber elastic body 3 and protruding radially outwardly over a tip end surfaces 35a, 35a of the side stoppers 35, 35. The protruded tip end portion 42 is protruded from the protruded base portion 41 toward the inner member 1 through the cavity 23 of the rubber elastic member 2. The paired elastic surface layers 43, 43 are extended from the protruded tip end portion 42 axially outwardly and covering the tip end surfaces of the side stopper 35, 35.

The vibration preventing apparatus thus constructed is produced in the following manner. Firstly, the rubber elastic body 2 and the elastic stopper 4 are vulcanized and formed integral with the inner member 1. Next, an adhering treatment is performed on a predetermined part of the vulcanizedly formed body. Here, the predetermined part is the part where the rubber elastic body 2 etc. are adhered to the mounting member 3, including the outer peripheral surfaces of the body portion 21 of the rubber elastic body 2 and the elastic stopper 4, the surfaces of the inside protruded portions 22a, 22a of the stopper portions 22, 22 of the rubber elastic body 2. On these surfaces or part, the adhering agent is coated.

Thereafter, the above vulcanizedly formed body having been subjected to the adhering treatment is disposed in the resin forming mold for forming the mounting member 3. At this time, each of the stopper portions 22, 22 of the rubber elastic body 2 has the inside protruded portion 22a have a large thickness in the axial direction, whereby both stopper portions 22, 22 can be set at the predetermined part on the resin forming mold without falling down. The mounting member 3 is formed by inject-molding the resin material in the cavity formed on the outer peripheral surface of the body portion 21 of the rubber elastic body 2. In this way, the mounting member 3 including the tubular portion 31 is formed to produce the vibration preventing apparatus shown in FIGS. 1 to 3. Here, the tubular portion 31 is adhered to the outer peripheral surfaces of the body portion 21 of the rubber elastic body 2 and the elastic stopper 4 at the inner surface thereof, and the surface of each of the step-like concave portions 31a, 31a is adhered to the inside protruded portion 22a of each of the stopper portions 22, 22.

The vibration preventing apparatus thus produced is used as the engine mount when the engine unit to be installed into the vehicle is mounted onto the vehicle body. In this case, the vibration preventing apparatus (the engine mount) is fixed at the inner member 1 to the engine unit or the vehicle body by inserting the mounting bolt into the inner hole 1a of the inner member 1, and at the mounting member 3 to the vehicle body or the engine unit. Here, the mounting member 3 is fixed to the vehicle body or the engine unit by screwing the bolts with the nuts 32a to 34a of the mount seating portions 32 to 34. This vibration preventing apparatus is mounted so that the elastic stopper 4 coincides with the main vibration inputting direction to the vibration preventing apparatus in the circumferential direction.

When the vibration is inputted from the engine unit to the vibration preventing apparatus, this vibration is effectively damped by the elastic deformation of the body portion 21 of the rubber elastic body 2 disposed between the inner member 1 and the tubular portion 31 of the mounting member 3. Here, in the case where the large vibration is inputted to the vibration preventing apparatus in the radial direction, the elastic stopper 4 regulates an excessive relative radial shift between the inner member 1 and the mounting member 3. On the other hand, in the case where the large vibration is inputted to the vibration preventing apparatus in the axial direction, the stopper portions 22, 22 disposed between end surfaces of the tubular portion 31 and the mating members (not shown) elastically attenuate the collision therebetween, so that excessive relative axial shift between the inner member 1 and the mounting member 3 is regulated. In this way, the satisfactory durability of the rubber elastic body 2 is secured by the excessive deformation prevention of the body portion 21.

As mentioned above, in this embodiment, the both stopper portions 22, 22 of the rubber elastic body 2 have the inside protruded portions 22a, 22a protruding inwardly over the end surfaces of the tubular portion 31 of the mounting member 3 and being contained in the step-like concave portions 31a, 31a formed at the end surfaces of the tubular portion 31. This inside protruded portions 22a, 22a increase the axial dimension (thickness) of the stopper portions 22, 22 to make them stable. In this way, when the rubber elastic body 2 etc. are disposed in the resin forming mold and the mounting member 3 is formed by the inject-molding, the both stopper portions 22, 22 can be set at the predetermined positions of the resin forming mold in the stabilized condition.

As a result, the tubular portion 31 (step-like concave portion 31a) of the mounting member 3 formed by the inject-molding and the stopper portions 22, 22 (inside protruded portions 22a, 22a) of the rubber elastic body 2 can be adhered satisfactorily. Also, on account of stabilization of the stopper portions 22a, 22a when the rubber resilient body 2 etc. are set in the resin forming mold, the disposing position of the resin pour-in port needs not be coincided with position of the stopper portions 22, 22, whereby the stopper portions 22,22 can be set at the suitable positions by the suitable size (circumferential length). In this way, not only the wasteful rubber material to form the stopper portions 22, 22 can be saved but the wasteful adhering working for the stopper portions 22, 22 can be saved, thus realizing reduction of the manufacturing cost and increase of the working efficiency.

In addition, the both stopper portions 22, 22 of the rubber elastic member 2 are adhered at the inside protruded portions 22a, 22a thereof to the surfaces of the step-like concave portions 31a, 31a of the tubular portion 31 of the mounting member 3, in other words, the mount end portions of the stopper portions 22, 22 which are the easiest to be peeled off from the tubular portion 31 in the adhesion of the stopper portions 22, 22 to the tubular portion 31 are located at positions spaced from the inside surfaces of the stopper portions 22, 22 (inside surface of the inside protruded portions 22a, 22a) outwardly. Consequently the adhering responsibility between the stopper portions 22, 22 and the tubular portion 31 increases. Thus, the stopper portions 22, 22 can exercise the stopper function stably.

Here, thickness of the stopper portions 22, 22 of the rubber elastic member 2 of the present invention do not increase outwardly, so distances between the outside surfaces of the stopper portions 22, 22 and the opposed mating members are not shortened, and therefore the stopper function of the stopper portions 22, 22 is not influenced or deteriorated. Also, the axial length of the tubular portion 31 of the mounting member 3 (length between both end surfaces of the tubular portion 31) is not changed, a large strength decrease of the tubular portion 31 is not caused, or durability deterioration of the rubber elastic body 2 due to the change of the relative axial amount shifted between the inner member 1 and the mounting member 3 is not caused.

According to the vibration preventing apparatus of the embodiment, the influences stopping the function of the stopper portions 22, 22 of the rubber elastic member 2 and strengthening the tubular portion 31 of the mounting member 3 can be made small, and the stability of the stopper portions 22, 22 in the formation of the mounting member 3 by the molding step can be secured, in an allowable mounting space.

The paired stopper portions 22, 22 are provided at both axial ends of the body portion 21 of the rubber elastic body 2 in the above vibration preventing apparatus of this embodiment. However, a single stopper portion 22 can be provided at only one axial end of the body portion 21.

Also, the both stopper portions 22, 22 are partially formed on the axial ends of the body portion 21 and each having the arch shape in the above embodiment. However, the stopper portion of each axial end can be constructed by plural parts each having arch shape, or by one ring-shape member.

Further, the elastic stopper 4 is provided between the inner member 1 and the mounting member 3 for regulating the excessive relative shift However, it is noted that the present invention can be applied to the bushing in which such elastic stopper 4 has not been provided.

What is claimed is:

1. A vibration preventing apparatus comprising:

an inner member;

a rubber elastic body including a tubular body portion fixed integrally to an outer peripheral surface of said inner member, and a stopper portion provided at one end of the tubular body portion to protrude radially outwardly and to extend circumferentially; and a mounting member being made of resin and including a tubular portion which is formed by inject-molding on an outer peripheral surface of the tubular body portion of said rubber elastic body and which is fixed integrally to the outer peripheral surface of the tubular body portion of the rubber elastic body and to the stopper portion;

wherein said stopper portion of said rubber elastic body has an inside portion protruded from an end surface of the tubular portion of said mounting member axially inwardly;

wherein said tubular portion of said mounting member has at an inner peripheral surface of the end surface a step-like concave portion concaved radially inwardly to receive the stopper portion of said rubber elastic body; and wherein the stopper portion of said rubber elastic body is provided at an end of the tubular portion partially along a circumferential direction to have an arch shape.

2. A vibration preventing apparatus according to claim 1, wherein the stopper portion of said rubber elastic body is provided at both ends of the body portion.

3. A vibration preventing apparatus comprising:

an inner member;

a rubber elastic body including a tubular body portion fixed integrally to an outer peripheral surface of said inner member, and a stopper portion provided at one end of the tubular body portion to protrude radially outwardly and to extend circumferentially; and a mounting member being made of resin and including a tubular portion which is formed by inject-molding on an outer peripheral surface of the tubular body portion of said rubber elastic body and which is fixed integrally to the outer peripheral surface of the tubular body portion of the rubber elastic body and to the stopper portion;

wherein said stopper portion of said rubber elastic body has an inside portion protruded from an end surface of the tubular portion of said mounting member axially inwardly;

wherein said tubular portion of said mounting member has at an inner peripheral surface of the end surface a step-like concave portion concaved radially inwardly to receive the stopper portion of said rubber elastic body; and wherein said rubber elastic body has in the tubular portion at least one cavity penetrating therethrough axially.

4. A vibration preventing apparatus according to claim 3, wherein the stopper portion of said rubber elastic body is provided at both ends of the body portion.

5. A vibration preventing apparatus comprising:

an inner member;

a rubber elastic body including a tubular body portion fixed integrally to an outer peripheral surface of said inner member, and a stopper portion provided at one end of the tubular body portion to protrude radially outwardly and to extend circumferentially;

a mounting member being made of resin and including a tubular portion which is formed by inject-molding on an outer peripheral surface of the tubular body portion of said rubber elastic body and which is fixed integrally to the outer peripheral surface of the tubular body portion of the rubber elastic body and to the stopper portion; and an elastic stopper disposed between said inner member and said mounting member for regulating an excessive relative shift of said inner member and said mounting member in the radial direction thereof;

wherein said stopper portion of said rubber elastic body has an inside portion protruded from an end surface of the tubular portion of said mounting member axially inwardly; and wherein said tubular portion of said mounting member has at an inner peripheral surface of the end surface a step-like concave portion concaved radially inwardly to receive the stopper portion of said rubber elastic body.

6. A vibration preventing apparatus according to claim 5, wherein said elastic stopper is disposed in a cavity formed in the tubular portion of said rubber elastic body to penetrate therethrough axially.

7. A vibration preventing apparatus according to claim 5, wherein the stopper portion of said rubber elastic body is provided at both ends of the body portion.

* * * * *